US009223467B1

(12) United States Patent
Landry

(10) Patent No.: US 9,223,467 B1
(45) Date of Patent: Dec. 29, 2015

(54) DISTRIBUTING ICONS SO THAT THEY DO NOT OVERLAP CERTAIN SCREEN AREAS OF A MOBILE DEVICE

(71) Applicant: SPRINT COMMUNICATIONS COMPANY L.P., Overland Park, KS (US)

(72) Inventor: Shane Jeremy Landry, Woodinville, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 379 days.

(21) Appl. No.: 13/722,719

(22) Filed: Dec. 20, 2012

Related U.S. Application Data

(63) Continuation of application No. 12/562,647, filed on Sep. 18, 2009, now Pat. No. 8,359,541.

(51) Int. Cl.
*G06F 3/048* (2013.01)
*G06F 3/0481* (2013.01)
*G06F 3/0484* (2013.01)

(52) U.S. Cl.
CPC ........ *G06F 3/04817* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 6,181,818 | B1 * | 1/2001 | Sato et al. | 382/170 |
| 8,584,043 | B2 * | 11/2013 | Cho et al. | 715/838 |
| 2004/0264780 | A1 * | 12/2004 | Zhang et al. | 382/224 |
| 2007/0110305 | A1 * | 5/2007 | Corcoran et al. | 382/167 |
| 2008/0013800 | A1 * | 1/2008 | Steinberg et al. | 382/118 |
| 2008/0040680 | A1 * | 2/2008 | Lee | 715/764 |
| 2008/0094421 | A1 * | 4/2008 | Maeda | 345/661 |
| 2008/0155481 | A1 * | 6/2008 | Kim et al. | 715/867 |
| 2008/0204565 | A1 * | 8/2008 | Yumiki | 348/208.99 |
| 2008/0316328 | A1 * | 12/2008 | Steinberg et al. | 348/222.1 |
| 2009/0005071 | A1 * | 1/2009 | Forstall et al. | 455/456.1 |
| 2009/0278958 | A1 * | 11/2009 | Bregman-Amitai et al. | 348/231.99 |
| 2010/0036734 | A1 * | 2/2010 | Pan | 705/14.55 |
| 2010/0056222 | A1 * | 3/2010 | Choi et al. | 455/566 |
| 2010/0058182 | A1 * | 3/2010 | Jung | 715/702 |

* cited by examiner

*Primary Examiner* — Tadeese Hailu

(57) ABSTRACT

Desired portions of a background image presented on a mobile device are prioritized for viewability. The background image, which includes desired feature components, is presented on a display of the mobile device. The desired feature components are identified from the background image. A user interface that includes an indication of the desired feature components is presented on the mobile device. One or more icon images are presented in accordance with the prioritization of the desired feature components of the background image.

20 Claims, 15 Drawing Sheets

DISTRIBUTING ICONS SO THAT THEY DO NOT OVERLAP CERTAIN SCREEN AREAS OF A MOBILE DEVICE

CROSS-REFERENCE TO RELATED APPLICATIONS

This application is a continuation of U.S. application Ser. No. 12/562,647, filed Sep. 18, 2009, entitled "Distributing Icons So That They Do Not Overlap Certain Screen Areas Of A Mobile Device," which is herein incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features or essential features of the claimed subject matter, nor is it intended to be used as an aid in isolation to determine the scope of the claimed subject matter.

Mobile devices provide many options that users may use to personalize their mobile device. For instance, most mobile devices allow users to personalize a background image presented on the screen of the user's mobile device. For example, users may choose to select an image of a loved one or an image of a favorite location. However, when used as a background image, the user's selected image may be partially or completely obscured by the presentation of icons on top of the background image. In order to ensure at least a desired portion of the selected image remains visible, the screen area associated with the desired portion must be protected from being populated by icon images.

In a first aspect, a set of computer-useable instructions embodied on computer-readable media provide a method of prioritizing viewability of one or more desired portions of a background image presented on a mobile device. The background image, which includes desired feature components, is presented on a display of the mobile device. The desired feature components are identified from the background image. A user interface that includes an indication of the desired feature components is presented on the mobile device. One or more icon images are presented in accordance with the prioritization of the desired feature components of the background image.

In a second aspect, a mobile device is provided that prioritizes viewability of one or more desired portions of a background image presented on the mobile device. The mobile device includes a display and one or more processing devices. The one or more processing devices are configured to present the background image, which includes desired feature components, on the display of the mobile device. The one or more processing devices are also configured to identify the desired feature components from the background image, present on the mobile device a user interface that includes an indication of the desired feature components, and present one or more icon images in accordance with a prioritization of the desired feature components of the background image.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
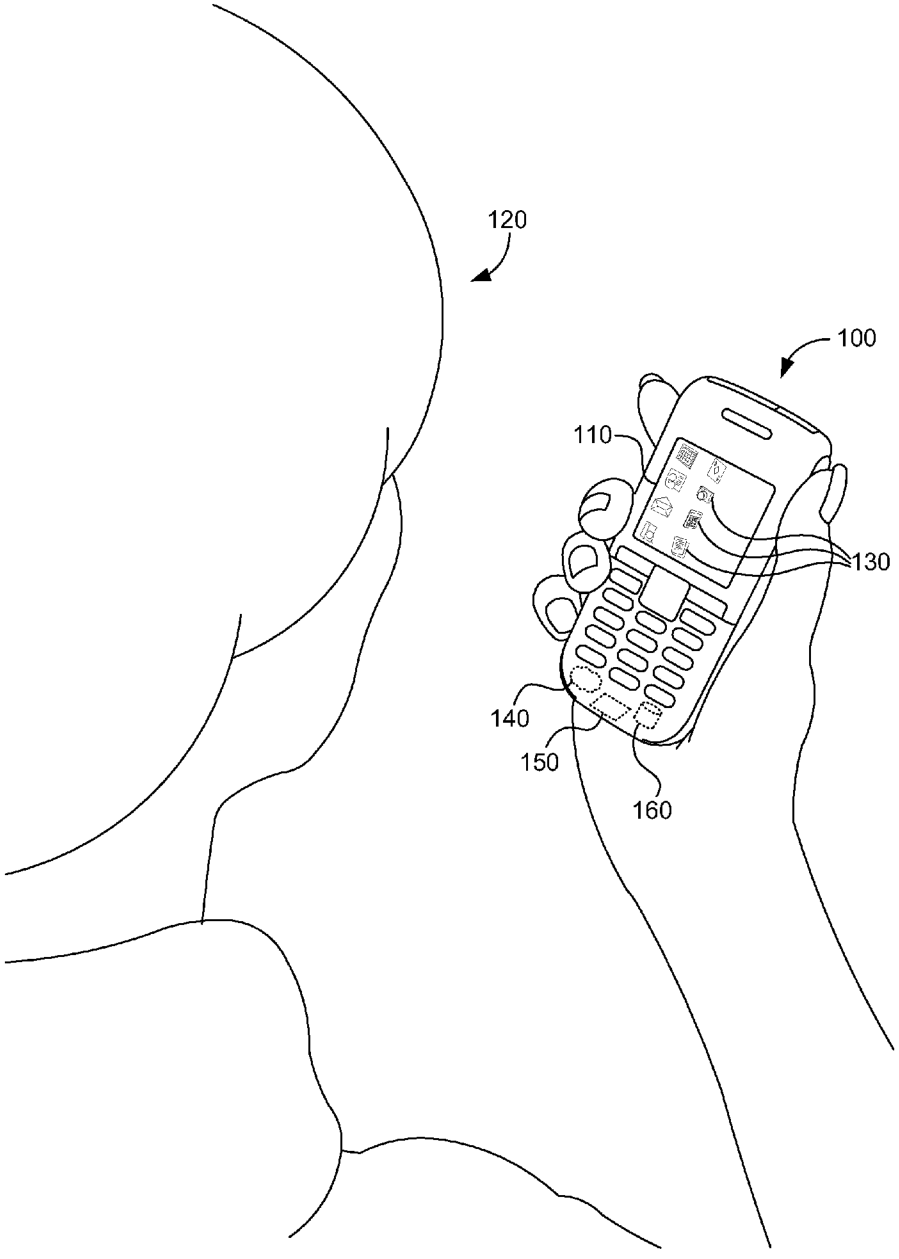
FIG. 1 depicts an illustrative mobile device in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CD Compact Disc
CD-ROM Compact Disk Read Only Memory
DVD Digital Versatile Discs
EEPROM Electrically Erasable Programmable Read Only Memory
MP3 MPEG-1 Audio Layer 3
PC Personal Computer
PDA Personal Digital Assistant
RAM Random Access Memory
ROM Read Only Memory Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for distributing icons so that they do not overlap certain screen areas of a mobile device. In particular, screen areas of a background image displayed on a screen of a mobile device may be identified as image portions that are desirable for protection. The personalization of protected image portions of a mobile device screen may be desirable to users. For example, a user who displays a family portrait as a background image on a screen of a mobile device may wish to keep icons from covering desired image portions, such as the faces of family members. In embodiments of the invention, icons may comprise user interface elements, items, desktop widgets, etc.

In embodiments of the present invention, the screen of the mobile device is logically divided into display divisions. For example, the display divisions may be divided into a grid pattern. In embodiments, icons may populate the grid-patterned display divisions in a logical manner, such as from top-to-bottom and left-to-right. Alternative embodiments envision other logical divisions of display divisions and/or other patterns of icon population that are systematic. As such, systematic divisions and/or patterns may be capable of resulting in different configurations of icons populating the screen of the mobile device.

When a background image is selected by a user, the icons populating the grid-patterned display divisions may be ordered independent of what is displayed on the background. This, in turn, may result in the icons fully or partially covering desired image portions of the background image. In order to ensure that the view of desired image portions of a background image are protected from obstruction by icons, the desired image portions may be identified and protected. The icons may then be presented in a way so as to avoid populating display divisions covering the desired image portions. In embodiments, display divisions covering the desired image portions may be referred to as "protected areas."

Desirable image portions may be identified by a user. A user may select a portion of a background image for protection, such as a face of a loved one. In response to the user's selection of a desired image portion, a protective circle may be placed over that portion of the background image. The user may select the size (for example, the length of the radius) of the protective circle. Alternatively, a computer program auto-selects the size of the circle that is desired based upon features in the picture. For example, if a user selects a face of a loved one to be protected, the computer program may identify the nearest face through the use of facial recognition software, and may establish a protected area through the use of a protective circle having a minimum radius necessary to encompass the primary facial characteristics of the face as determined by the software. In further embodiments, the protective circular areas may have a buffer area that is also protected from obstruction by an icon. For example, a user may select the face of a loved one but may also desire for an extra half-centimeter radius to be included in the measure of the radius to keep icons from being presented too close to the desired image portion. In embodiments, a desired image portion may also be referred to as a selected image portion.

In alternative embodiments, desirable image portions are identified by an algorithm or other computer-executable instructions. In particular, desirable image portions may be identified through the use of facial recognition software as discussed above. Additionally, the area of the protective circle used to protect the identified facial features may be buffered by an increase in the radius of the circle used to protect the image. This increase in radius may be a factor set by the user.

Once an image portion has been designated as being protected, icons may be prevented from fully or partially obstructing the protected image portion. In embodiments, display divisions that correspond to all or part of a protected area of an image portion may be designated as unavailable to display an icon. Accordingly, when icons are presented, they will be presented in a default pattern that recognizes display divisions that are occupied. In alternative embodiments, when icons are moved by a user, areas associated with display divisions that correspond to all or part of a protected area of an image portion may be unavailable to host icons. For example, when a user tries to move an icon over a protected area, the icon may be assigned to the nearest available display division. As such, in embodiments, a user is unable to move icons to partially or fully obstruct protected areas.

In further embodiments, the placement and/or size of display divisions are dependent upon the size of selected image portions. For instance, if an image portion takes up more than a threshold percentage of the area of a screen, e.g., 30%, the size of the display division and, accordingly, the size of the icons may be reduced. Accordingly, display divisions may also be tailored to match the size of the selected image portions.

Turning now to FIG. 1, an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a PDA. This description does not intend to convey bright-line distinctions between the different types of mobile devices. Indeed, what one might refer to as a PDA, another might refer to as a mobile device or cell phone or even a PC.

Mobile device 100 may include a user interface 110, a user 120, one or more icons 130, application 140, memory 150, and data structure 160. Generally, user interface 110 and icons 130 provide an input/output (I/O) interface that user 120 may engage to interact with device 100. For example, user interface 110 may include a touch screen that a user may scratch or touch to interact with device 100. This interaction may include selecting an image to display in the background of the user interface 110.

The mobile device 100 can be any computing device. In embodiments, mobile device 100 may be capable of web accessibility. Device 100 might take on a variety of forms, such as a personal computer (PC), a laptop computer, a mobile phone, a personal digital assistance (PDA), a CD player, an MP3 player, a video player, a handheld communications device, a workstation, any combination of these devices, or any other mobile device, including a device that is capable of web accessibility. In one embodiment, device 100 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker (s), memory, a buffer(s), and the like.

Device 100 may also include application 140, memory 150, and data structure 160. Application 140 may carry out various functional aspects and might take on a variety of forms. For example, application 140 might include configuration settings, might facilitate communicating data between multiple devices, might handle updates, include user settings, etc. Specifically, application 140 may be used to implement a method for protecting the viewability of desired image portions presented on user interface 110 of mobile device 100. For example, application 140 may use computer software to recognize desired image portions and recognize facial structures.

Memory 150 may include a data structure 160 that stores and facilitates the operation of application 140. For example, memory 150 may store data relating to an image and/or information displayed on user interface 110, as well as information related to the selected image portions. In addition, memory 150 may store firmware and other various software modules and components that might be present in mobile device 100. These modules and components may be used in embodiments of the present invention to protect the viewability of desired image portions presented on mobile device 100. Other examples of illustrative software include things such as the operating system of a phone, third-party applications such as games, programs to watch television on the device, ring tones, location-based services, contact information, and the like. In sum, FIG. 1 is not meant to indicate all, or even major, systems or components of mobile device 100. An overview of mobile device 100 is presented and certain components are listed so as to be able to refer to them throughout this disclosure.

Figure 2:
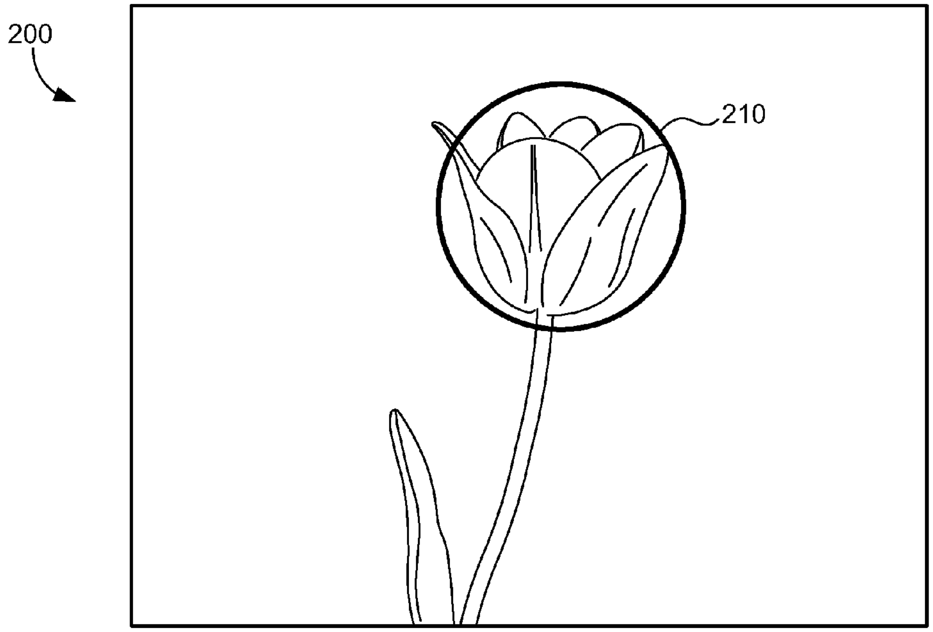
FIG. 2 depicts an illustrative selected image portion of a background image in accordance with an embodiment of the present invention.

In order to protect desired portions of a background image from being populated by icons, a portion may first be identified to be protected. FIG. 2 depicts an illustrative selected image portion 210 of a background image 200 in accordance with an embodiment of the present invention. Selected portion 210 of a background image 200 may be selected through the use of an algorithm used to identify desirable characteristics, such as facial characteristics. Algorithms may be executed through the use of application 140. Alternatively, image portion 210 are manually selected by a user. Whereas image portion 210 is encapsulated by a circle, in alternative embodiments, the shape of the boundary of a selected image portion may vary. For example, with regard to background image 200, an alternative selected image portion may include the shape of the tulip head. Alternatively, a selected image portion may include the shape of a square, an oval, and/or a rectangle, etc.

Figure 3:
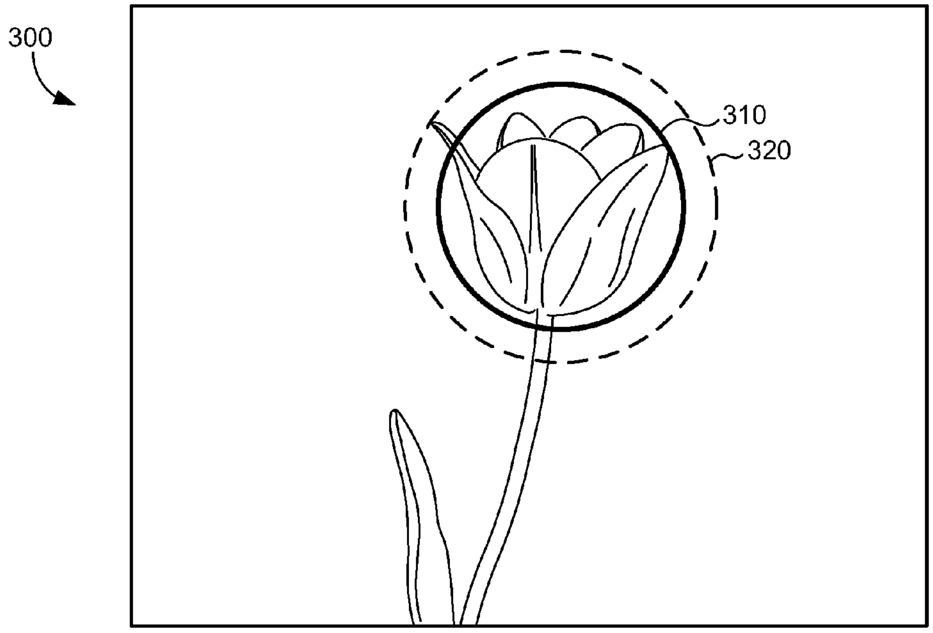
FIG. 3 depicts an illustrative selected portion of a background display with a buffer area in accordance with an embodiment of the present invention.

In addition to a selected portion, a buffer area may be identified to be protected from the population of icons. FIG. 3 depicts an illustrative selected portion 310 of a background display 300 with a buffer area in accordance with an embodiment of the present invention. The buffer area includes the area between a dashed-line alternative selected portion 320 and the solid-line selected portion 310. A user may select a control option to choose to have a buffer area surround a selected portion 310. In further embodiments, a buffer region may be determined based on the size of a selected portion. For example, application 140 may identify a selected portion. Subsequent to the identification of the selected portion, application 140 may add a buffer area proportional to the size of the selected portion, e.g. application 140 may add a buffer area extending ¼ the radius of the circle encapsulating the selected portion. In embodiments, as icons begin to fully populate non-protected screen areas, the buffer area may be reduced or eliminated so as to make additional space available to populate icons.

Figure 4:
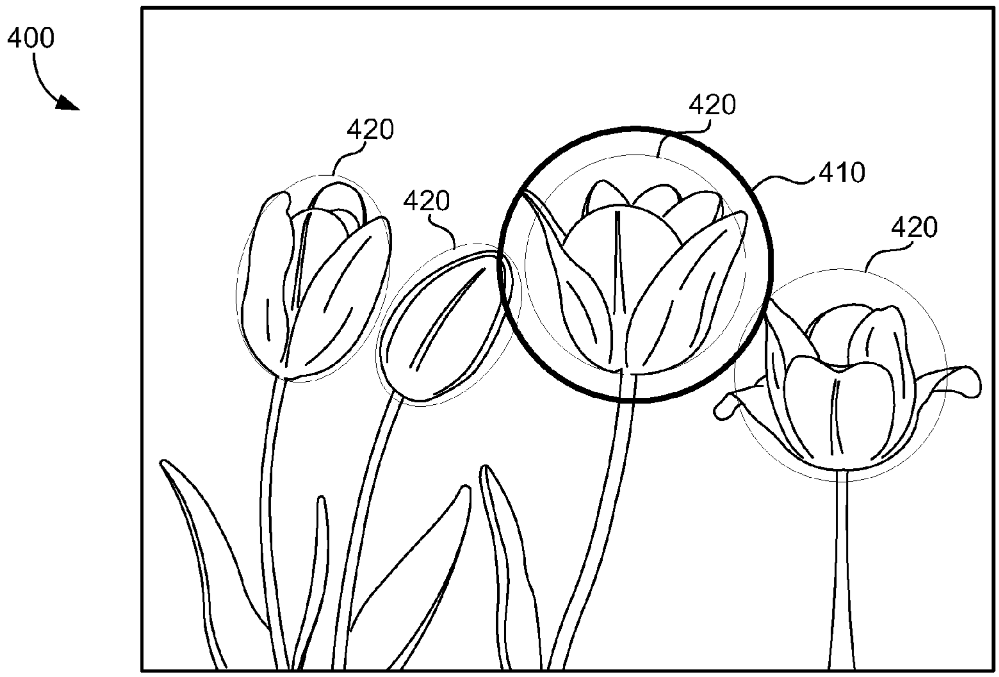
FIG. 4 depicts an illustrative selected portion from a group of image portions of a background display in accordance with an embodiment of the present invention.

FIG. 4 depicts an illustrative selected portion 410 from a group of image portions 420 of a background display 400 in accordance with an embodiment of the present invention. The image portions 420 of FIG. 4 may be identified by an algorithm, such as application 140, that identifies unique image portions of an image. Unique image portions may include a complexity of shapes and/or colors. As seen in FIG. 4, each of the tulip heads would be identified as a unique image portion 420. From among the unique image portions 420, a user may select one image portion 410 to signify an area the user would like to protect from being covered by icons.

Figure 5:
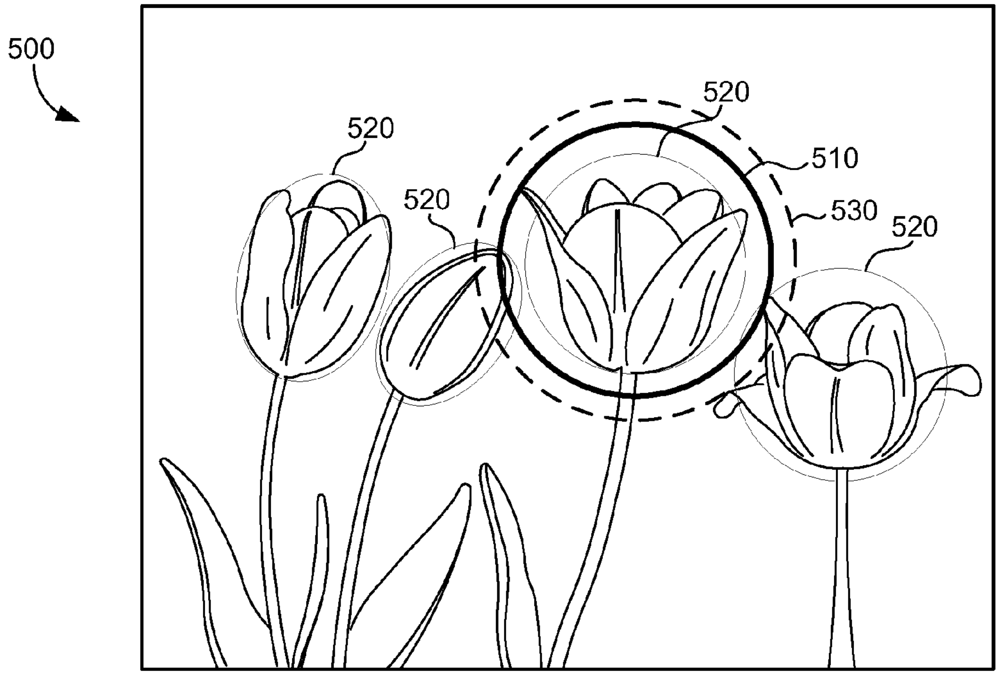
FIG. 5 depicts an illustrative portion with a buffer area selected from a group of image portions of a background display in accordance with an embodiment of the present invention.

A selected portion identified from a group of image portions, such as that seen in FIG. 4, may also be surrounded by a buffer area that is also protected from icon population. FIG. 5 depicts an illustrative portion 510 with a buffer area selected from a group of image portions 520 of a background display 500 in accordance with an embodiment of the present invention. Similar to FIG. 4, the image portions 520 of FIG. 5 may be identified by an algorithm that identifies unique image portions of an image. Unique image portions may include a complexity of shapes and/or colors. As seen in FIG. 5, each of the tulip heads would be identified as an unique image portion 520. From among the unique image portions 520, a user may select one image portion 510 to signify an area the user would like to protect from being covered by icons. Additionally, FIG. 5 also includes a representation of an alternative selected portion 530 that includes a buffer area between the dashed-line alternative selected portion 530 and the solid-line selected portion 510. In alternative embodiments, a user selects a control option to have a buffer area surround a selected portion 510.

Figure 6:
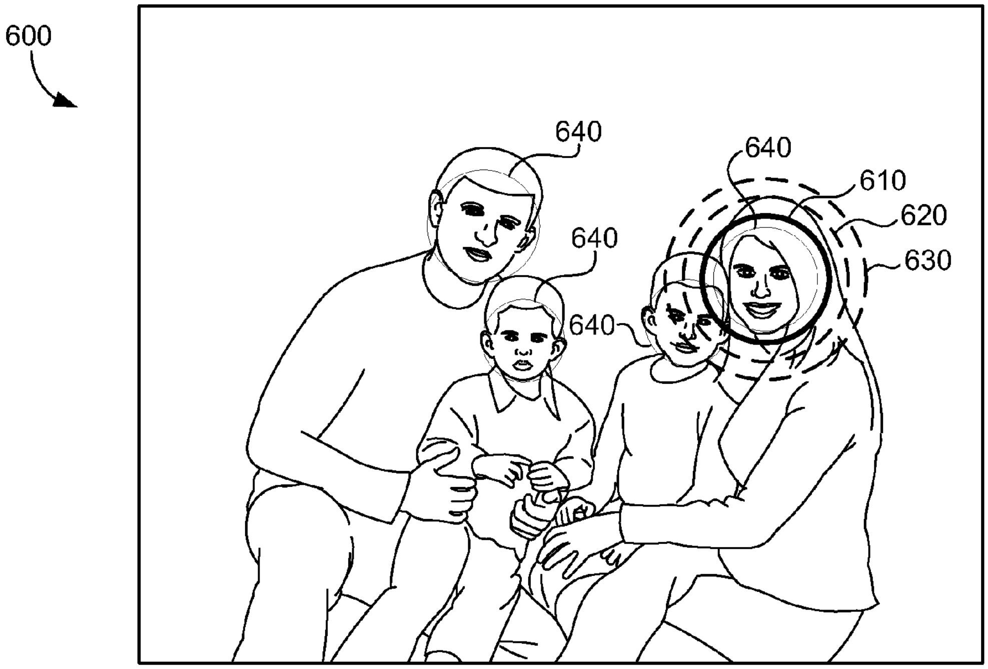
FIG. 6 depicts an illustrative facial image portion with buffer areas selected from a group of facial image portions of a background display in accordance with an embodiment of the present invention.

In addition to desired images of flowers, faces may also be protected from being overlapped by icons. These faces may also include a choice of varying degrees of buffer areas to surround one or more faces. FIG. 6 depicts an illustrative facial image portion 610 with buffer areas selected from a group 640 of facial image portions of a background display 600 in accordance with an embodiment of the present invention. Similar to FIG. 5, the group 640 of facial image portions of FIG. 6 may be identified by an algorithm that identifies facial image portions of an image. Facial image portions may be recognized through the use of facial recognition software executed by an application, such as application 140. As seen in FIG. 6, each of the faces presented would be identified as part of the group 640 of facial image portions. From among the group 640 of facial portions, a user may select one image portion 610 to signify an area the user would like to protect from being covered by icons. Additionally, FIG. 6 also includes representations of alternative selected portions 620 and 630 that include buffer areas between the dashed-line alternative selected portion 630 and the solid-line selected portion 620, and between dashed-line alternative selected portions 620 and 610, respectively. In alternative embodiments, a user selects a control option to have a buffer area surround a selected portion 610.

Figure 7:
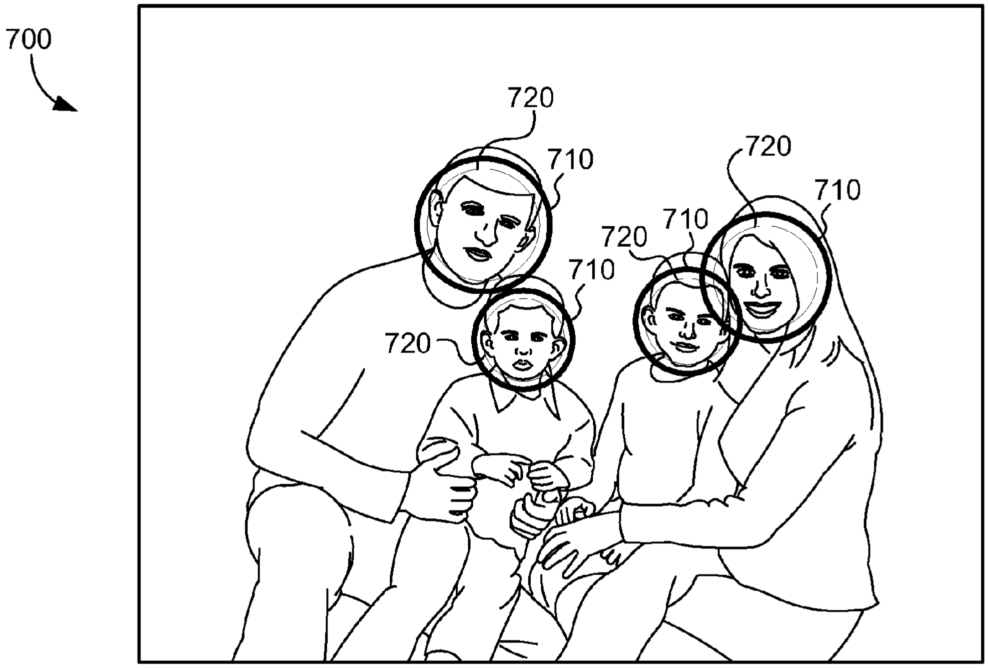
FIG. 7 depicts illustrative selected portions from a group of facial image portions of a background display in accordance with an embodiment of the present invention.

In determining selected areas to be protected from overlapping icons, more than one facial image may be identified. FIG. 7 depicts illustrative selected portions 710 from a group 720 of facial image portions 720 of a background display 700 in accordance with an embodiment of the present invention. The group 720 of facial image portions of FIG. 7 may be identified by an algorithm that identifies facial image portions of an image. Facial image portions may be recognized by a computer program, such as application 140, through the use of facial recognition software. As seen in FIG. 7, each of the faces displayed in background image 700 would be identified as part of the group 720 of facial image portions. From among the group 720 of facial image portions, a user may select image portions 710 to signify areas the user would like to protect from being covered by icons.

Figure 8:
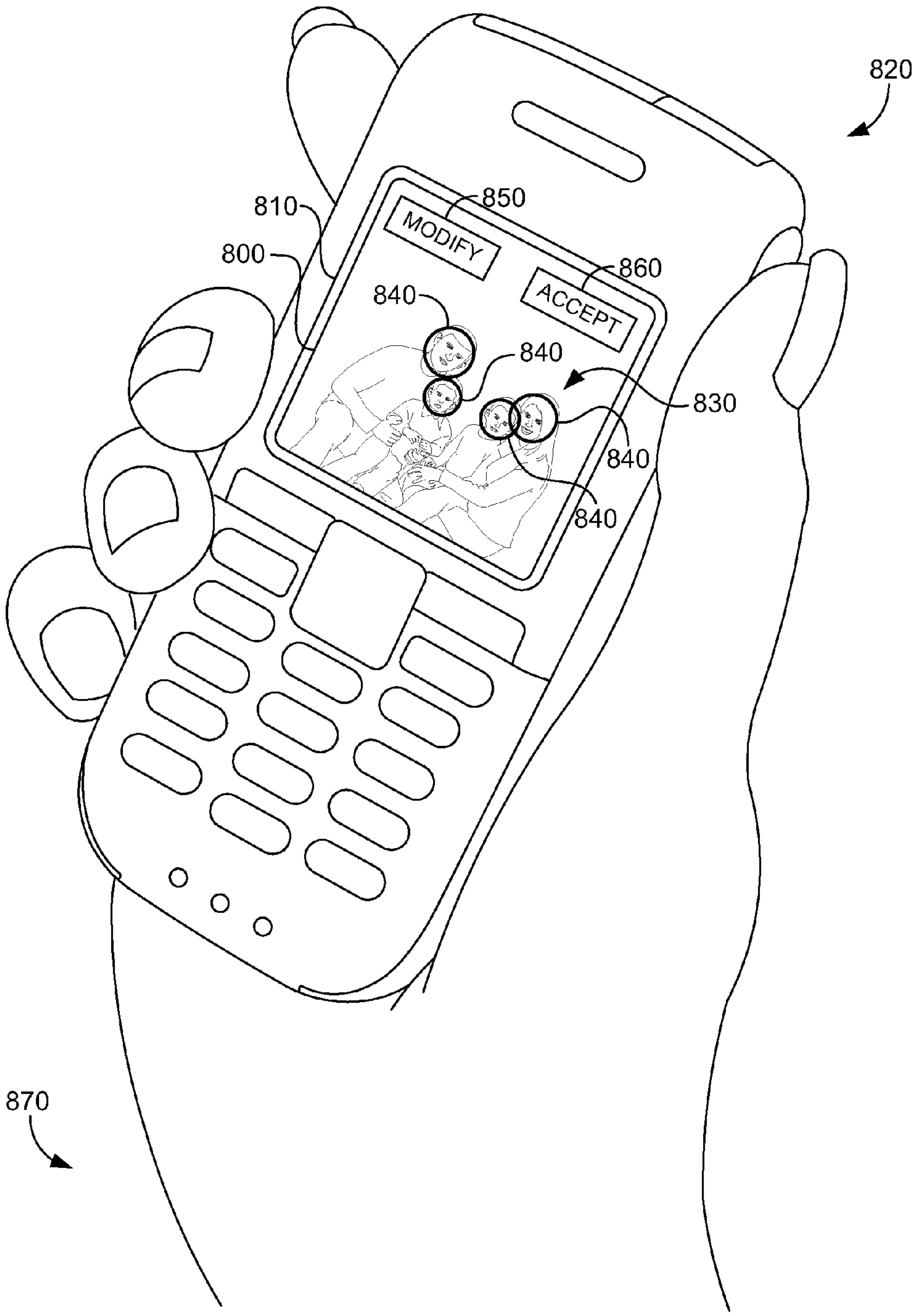
FIG. 8 depicts an illustrative user interface presented on the display screen of mobile device.

In order to affirm the selection of protected image portions, a user may be shown a user interface to affirm the selection of image portions to be protected. Accordingly, FIG. 8 depicts an illustrative user interface 800 presented on display screen 810 of mobile device 820 in accordance with an embodiment of the present invention. User interface 800 includes background image 830, selected image portions 840, a modify button 850, and an accept button 860. In embodiments, application 140 generates user interface 800. Application 140 may then receive one or more inputs from user 820 in response to user interface 800. Application 140 may then modify or affirm a selected presentation of icons in accordance with the input received from user 820. User interface 800 is presented to the user 820 in order to allow the user 870 to modify or affirm the selected image portions 840 presented in accordance with embodiments of the present invention.

Figure 9:
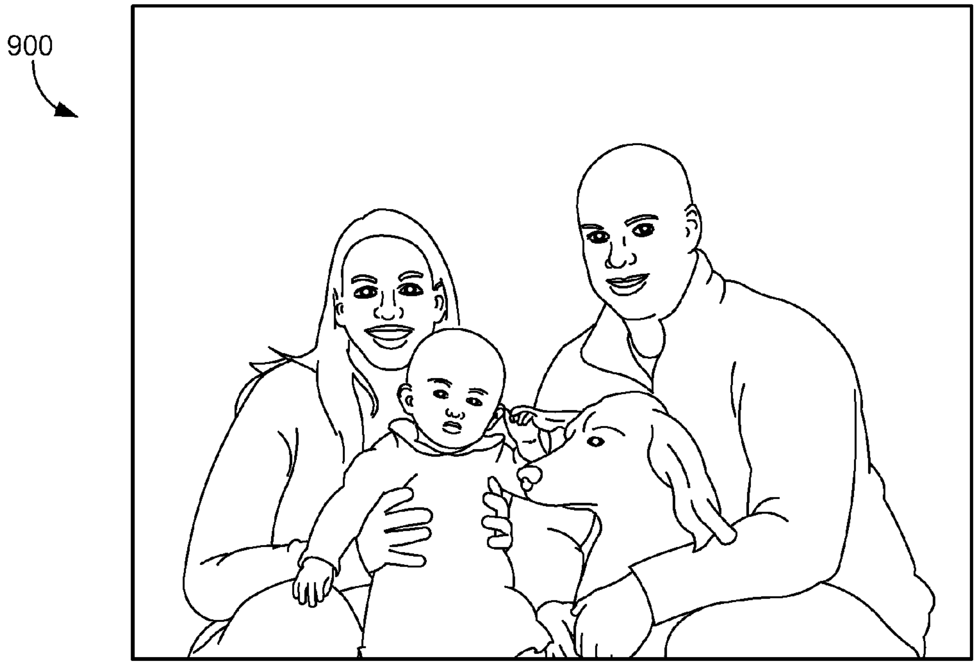
FIG. 9 depicts an illustrative background image used in embodiments of the present invention.
Figure 10:
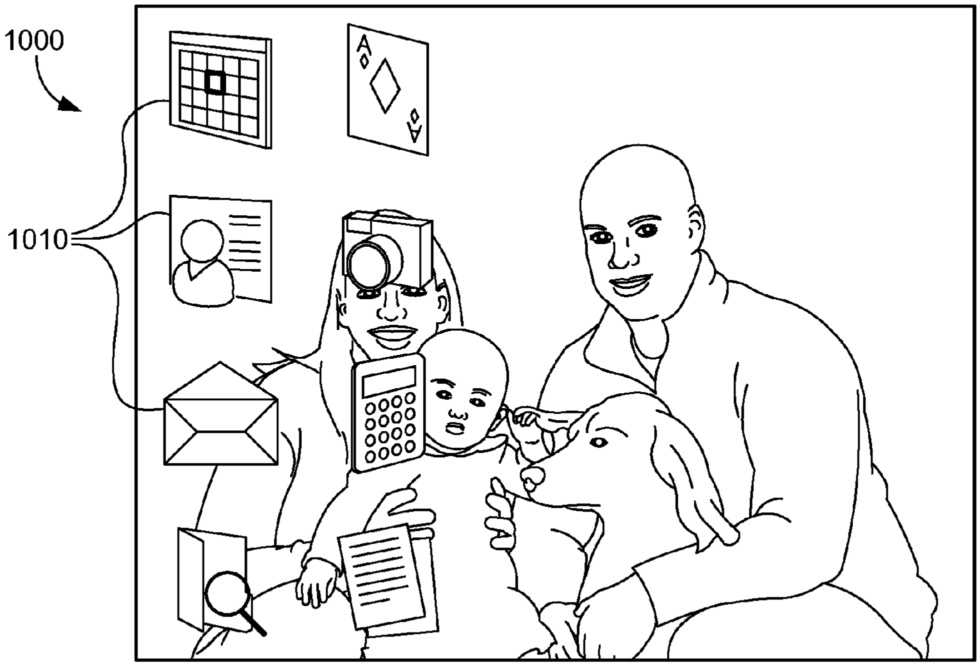
FIG. 10 depicts an illustrative display of icons presented on top of background image used in embodiments of the present invention.

FIG. 9 depicts an illustrative background image 900 used in embodiments of the present invention. Additionally, FIG. 10 depicts an illustrative display of icons 1010 presented on top of background image 1000 used in embodiments of the present invention. Accordingly, FIGS. 9 and 10 indicate conditions of a mobile screen device before the application of embodiments of the present invention.

Figure 11:
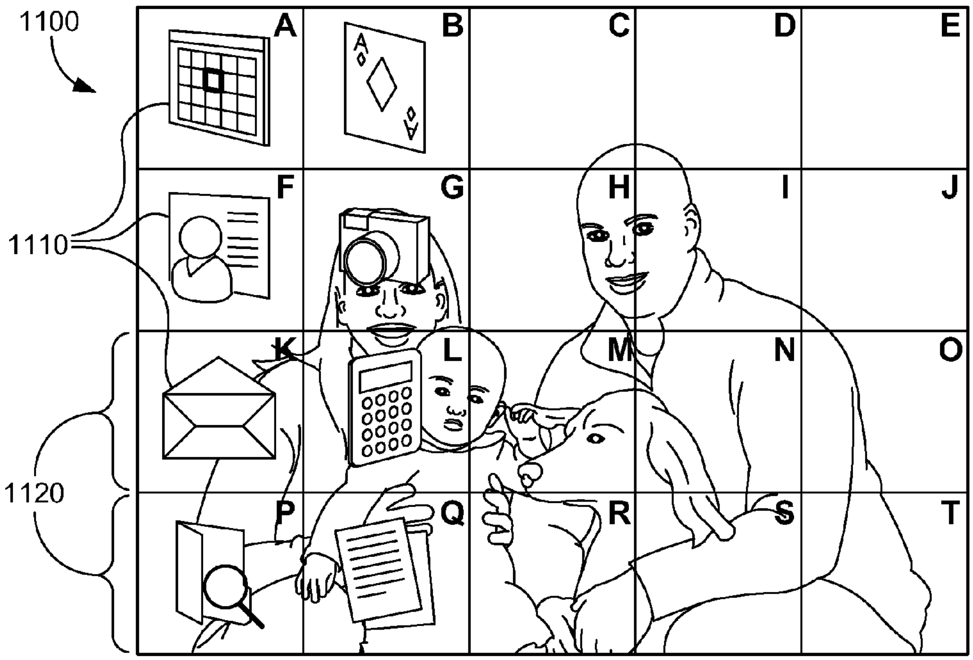
FIG. 11 depicts an illustrative graphical display of icons presented on top of a background image in accordance with an embodiment of the present invention.

A presentation of icons covering the face of an individual depicted in a background image is shown in FIG. 11. FIG. 11 depicts an illustrative graphical display of icons 1110 presented in a grid pattern 1120 on top of a background image 1100 in accordance with an embodiment of the present invention. While the presentation pattern of the icons 1110 in FIG. 11 is top-to-bottom and left-to-right, other presentation patterns may be used in the population of icons. As seen in FIG. 11, however, the result of a standard pattern used to populate icons 1110 has partially obscured a face of an individual in the background image 1100.

Figure 12:
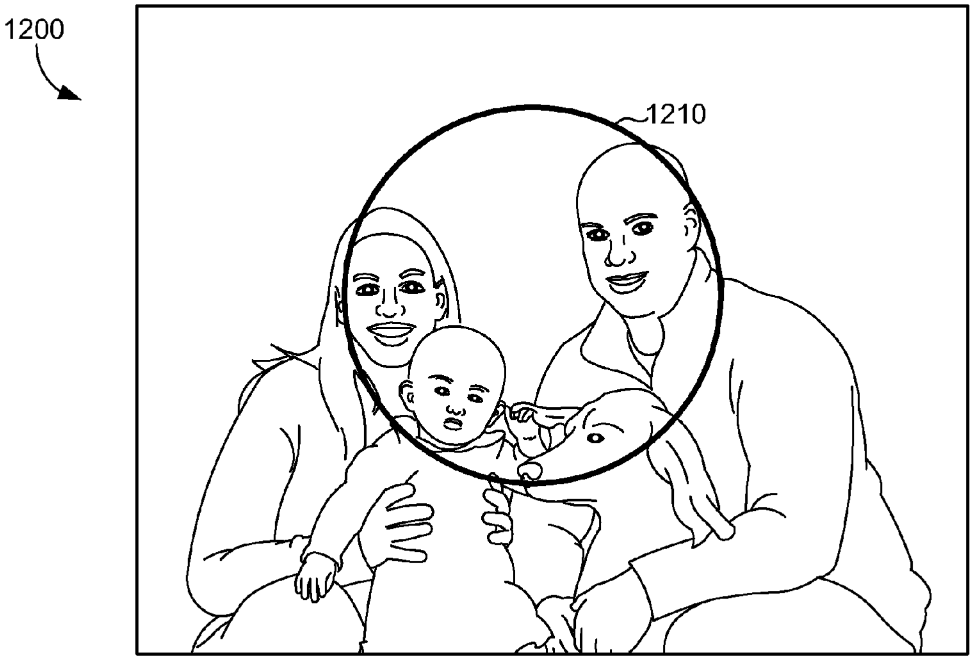
FIG. 12 depicts an illustrative selected portion of a background image in accordance with an embodiment of the present invention.

In order to protect portions of a background image from being obscured, desirable portions may be selected for protection from icon overlapping. FIG. 12 depicts an illustrative selected portion 1210 of a background image 1200 in accordance with an embodiment of the present invention. Similar to FIG. 2, selected portion 1210 of a background image 1200 may be selected through the use of an algorithm used to identify desirable characteristics, such as facial characteristics. Alternatively, image portion 1210 is manually selected by a user. Whereas image portion 1210 is encapsulated by a circle, in embodiments, the shape of the boundary of a selected image portion may vary. For example, with regard to background image 1200, an alternative selected image portion may include the shape of a square, an oval, a rectangle, etc. As used in FIG. 12, it can be seen that all faces of the representative family are included in image, but the face of the dog is only partially protected.

Figure 13:
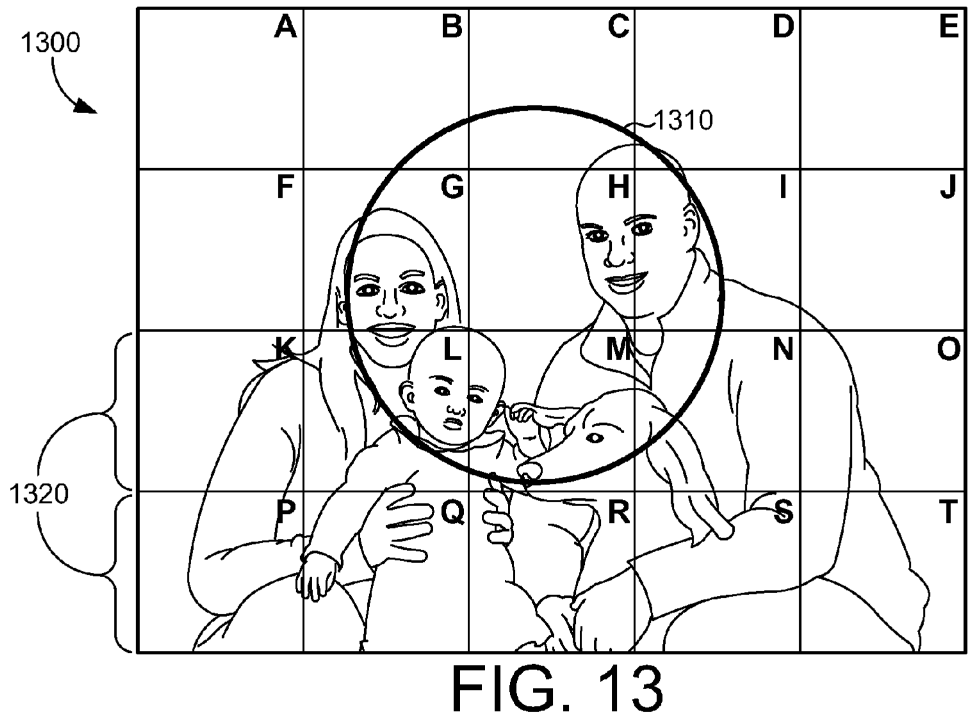
FIG. 13 depicts an illustrative grid-patterned selected portion of a background image in accordance with an embodiment of the present invention.

Once image portions have been selected, a determination is made as to which areas of the display of the mobile screen should be protected from icon population. FIG. 13 depicts an illustrative grid-patterned 1320 selected portion 1310 of a background image 1300 in accordance with an embodiment of the present invention. In embodiments, grid blocks represent the logically divided display divisions as discussed above. It can be seen from FIG. 13 that grid blocks B-D, G-I, and L-N include part of selected portion 1310. Accordingly, grid blocks B-D, G-I, and L-N may be selected to be protected from icon population in accordance with embodiments of the present invention.

Figure 14:
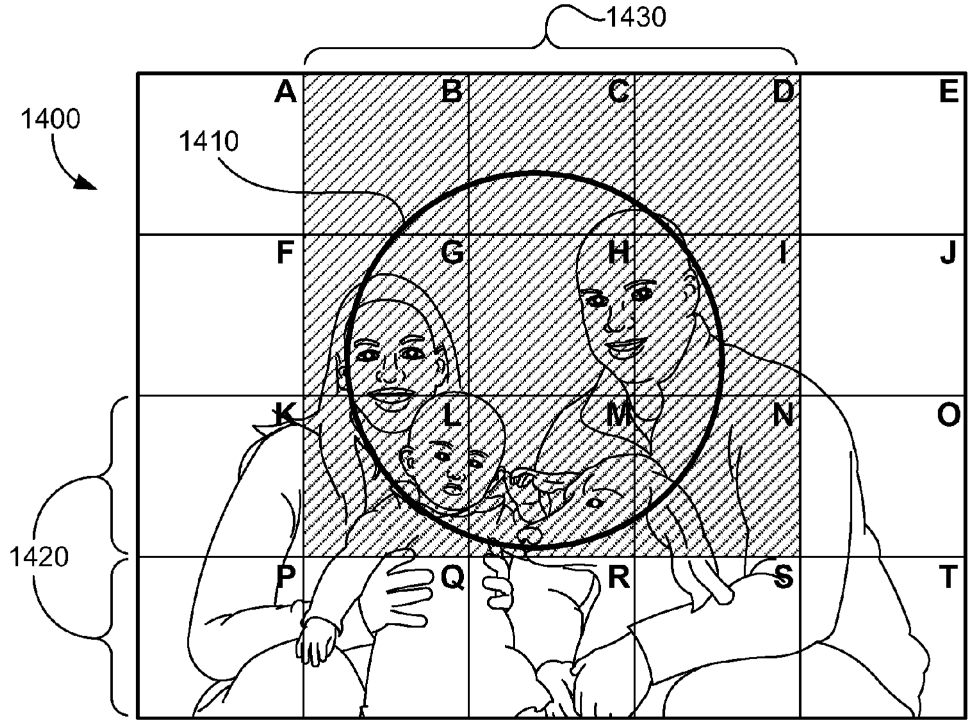
FIG. 14 depicts an illustrative grid-patterned protection block of a background image in accordance with an embodiment of the present invention.

The protections of blocks B-D, G-I, and L-N from icon population is illustrated in FIG. 14. FIG. 14 depicts an illustrative grid-patterned 1420 selected portion 1410 of a background image 1400 covered by a protection block 1430 of a background image in accordance with an embodiment of the present invention. As seen in FIG. 14, the grid blocks that include the protection block 1430 are B-D, G-I, and L-N. As such, the protection block includes each grid block that includes at least part of selected portion 1410.

Figure 15:
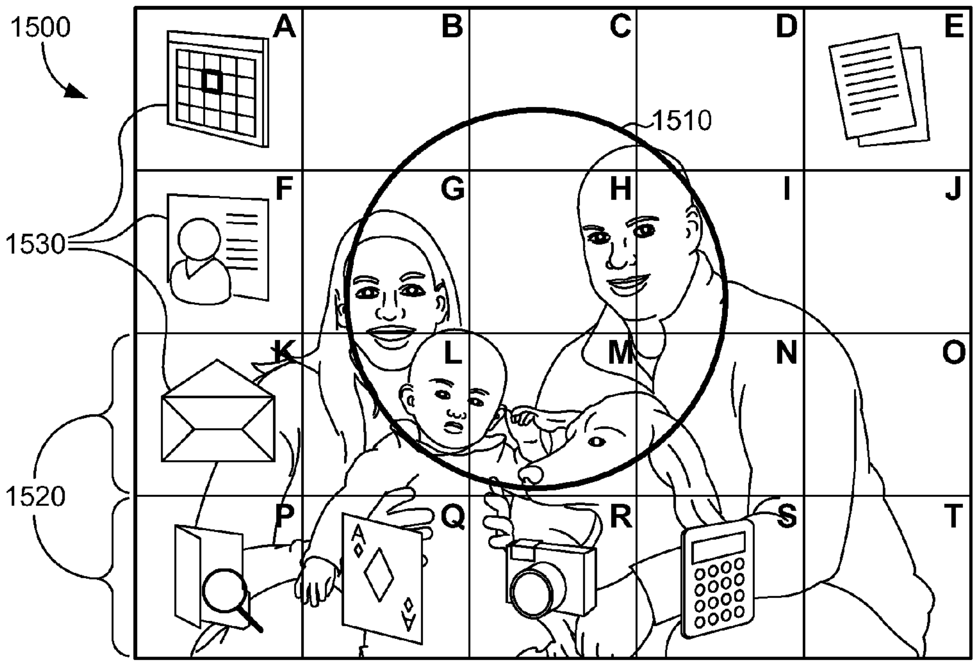
FIG. 15 depicts an illustrative presentation of icons on a grid-patterned selected portion of a background image in accordance with an embodiment of the present invention.

Once a protection block has been identified, icons may populate the remaining, unprotected portions of a mobile screen. FIG. 15 depicts an illustrative presentation of icons 1530 on a grid-patterned 1520 selected portion 1510 of a background image 1500 in accordance with an embodiment of the present invention. As seen in FIG. 15, icons 1530 populate the grid 1520 in accordance with protection block 1430, identified in FIG. 14, so as to avoid covering selected portion 1510 of background image 1500. This is in contrast to FIG. 11, where the population of icons 1110 was independent of protected portions of a background image.

Figure 16:
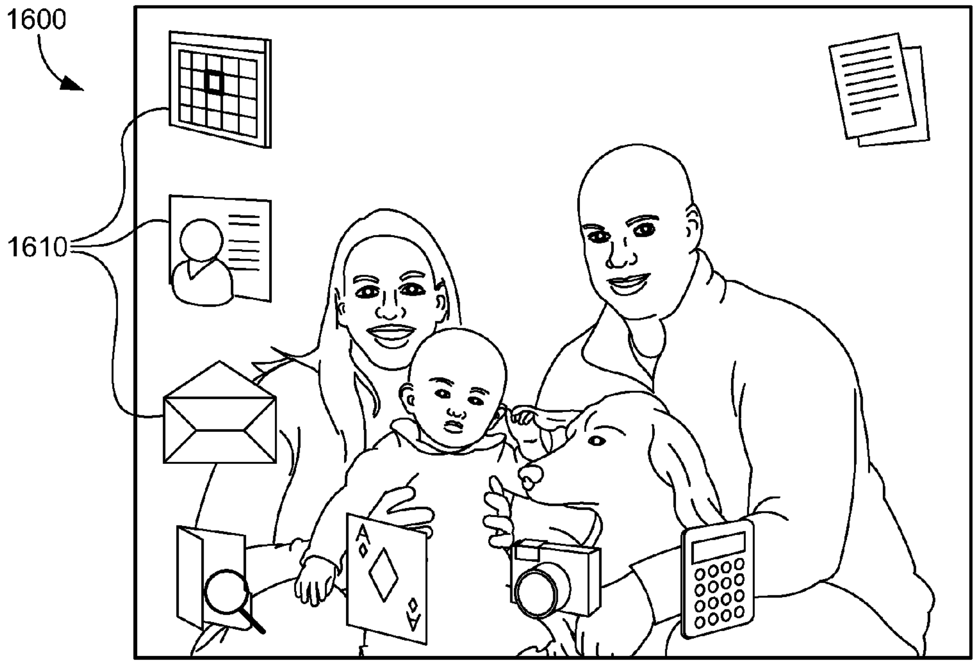
FIG. 16 depicts an illustrative presentation of icons on a selected portion of a background image in accordance with an embodiment of the present invention.

As seen in FIG. 16, in accordance with embodiments of the present invention, the resulting display screen of a mobile device provides a presentation of icons that is consistent with the protected portions of a background image. FIG. 16 depicts an illustrative presentation of icons 1610 in accordance with a selected portion of a background image 1600 in accordance with an embodiment of the present invention. FIG. 16 presents an alternative resultant image showing the distribution of icons in accordance with an embodiment of the present invention as would be seen on a screen of a mobile device. In some embodiments, resultant FIG. 16 may be the result of a redistribution of icons that have already begun to encroach on desired image portions. In alternative embodiments, the distribution of icons is ordered to prevent overlapping with selected portions as icons are added to the screen of the mobile device.

Figure 17:
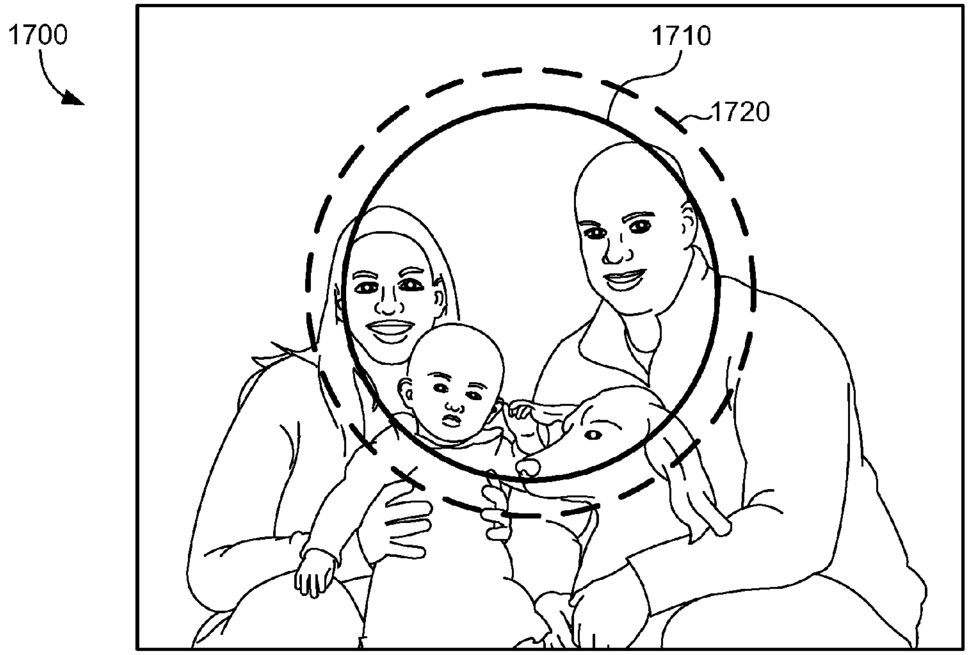
FIG. 17 depicts an illustrative selected portion of a background display with a buffer area in accordance with an embodiment of the present invention.

In addition to the embodiment of the invention discussed above, a distribution of icons may be presented in accordance with a buffer area around a selected portion. Accordingly, FIG. 17 depicts an illustrative selected portion 1710 of a background display 1700 with a buffer area in accordance with an embodiment of the present invention. The buffer area includes the area between selected portion 1710 and alternative selected portion 1720. Similar to FIG. 12, selected portion 1710 and alternative selected portion 1720 of a background image 1700 may be selected through the use of an algorithm used to identify desirable characteristics, such as facial characteristics. Alternatively, image portions 1710 and 1720 are manually selected by a user. Whereas image portions 1710 and 1720 are encapsulated by a circle, in embodiments, the shape of the boundary of a selected image portion may vary. For example, with regard to background image 1700, an alternative selected image portion may include the shape of a square, an oval, and/or a rectangle, etc. As used in FIG. 17, it can be seen that all faces of the representative family are included in image portion 1710. Additionally, in contrast to FIG. 12, image portion 1720 includes the faces of the family, and also includes the face of a dog.

Figure 18:
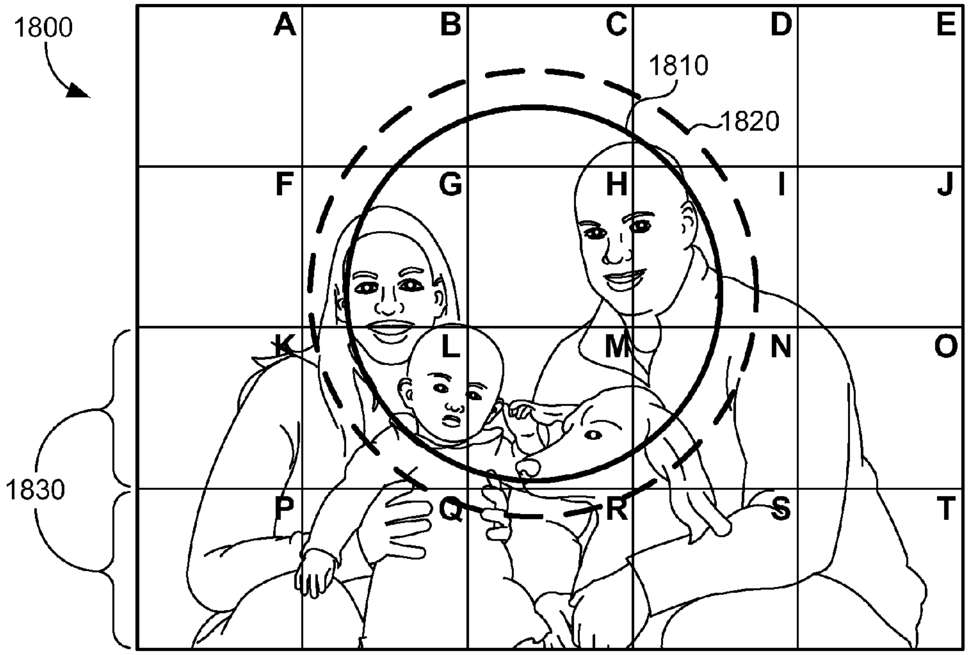
FIG. 18 depicts an illustrative grid-patterned selected portion of a background image with a buffer area in accordance with an embodiment of the present invention.

Once an image portion and a buffer area has been selected, a determination is made as to which areas of the display of the mobile screen should be protected from icon population. FIG. 18 depicts an illustrative grid-patterned 1830 alternative portion 1810 of a background image 1800 with a buffer area in accordance with an embodiment of the present invention. The buffer area includes the area between selected portion 1810 and alternative selected portion 1820. Due to the increase in the radius of selected portion 1810, it can be seen from FIG. 18 that grid blocks B-D, G-I, L-N, and Q-S include part of selected portion 1810. In embodiments, grid blocks represent the logically divided display divisions as discussed above.

Figure 19:
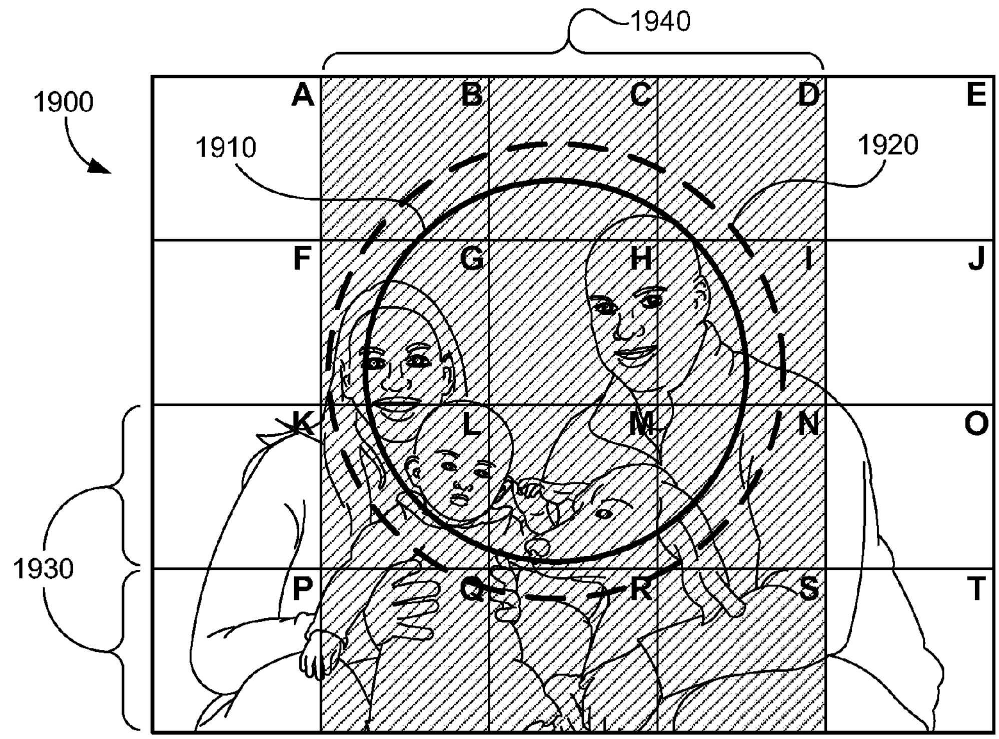
FIG. 19 depicts an illustrative grid-patterned protection block of a background image with a buffer area in accordance with an embodiment of the present invention.

The protections of blocks B-D, G-I, L-N, and Q-S from icon population is illustrated in FIG. 19. FIG. 19 depicts an illustrative grid-patterned 1930 selected portion 1910 of a background image 1900 covered by a protection block 1940 with a buffer area in accordance with an embodiment of the present invention. The buffer area includes the area between selected portion 1920 and alternative selected portion 1910. As seen in FIG. 19, the grid blocks that include the protection block 1940 are B-D, G-I, L-N, and Q-S. As such, the protection block includes each grid block that includes at least part of alternative portion 1920.

Figure 20:
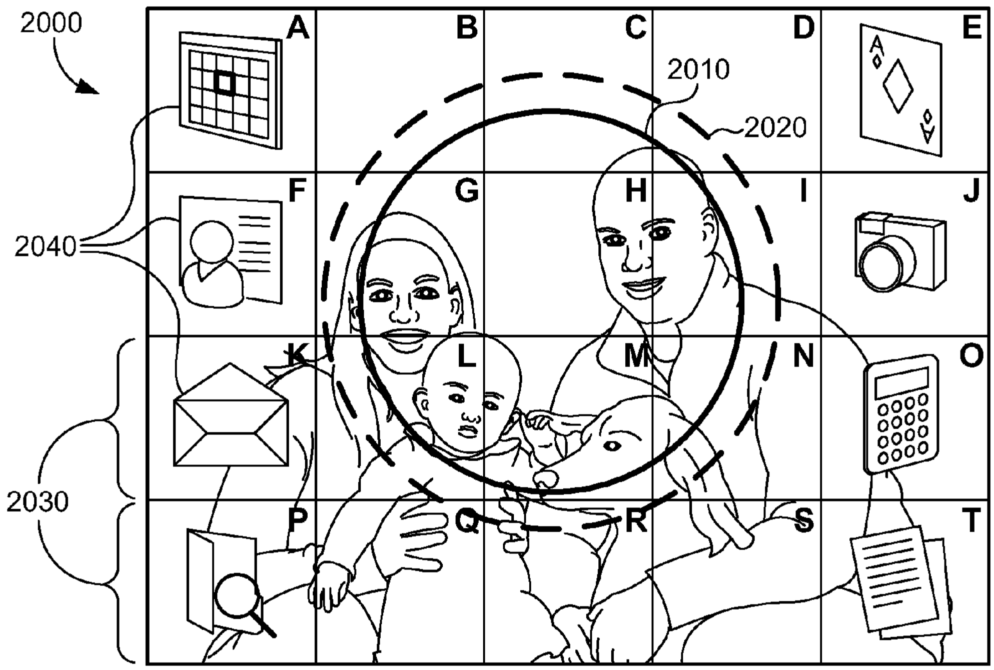
FIG. 20 depicts an illustrative presentation of icons on a selected portion of a background image with a buffer area in accordance with an embodiment of the present invention.

Once a protection block has been identified, icons may populate the remaining, unprotected portions of a mobile screen. FIG. 20 depicts an illustrative presentation of icons 2040 included on a grid-patterned 2030 selected portion 2010 of a background image 2000 with a buffer area in accordance with an embodiment of the present invention. The buffer area includes the area between selected portion 2010 and alternative selected portion 2020. As seen in FIG. 20, the icons 2040 populate the grid 2030 in accordance with protection block 1940, identified in FIG. 19, so as to avoid covering the selected portion 2010 of background image 2000. This is in contrast to FIG. 11, where the population of icons 1110 was independent of protected portions of a background image.

Figure 21:
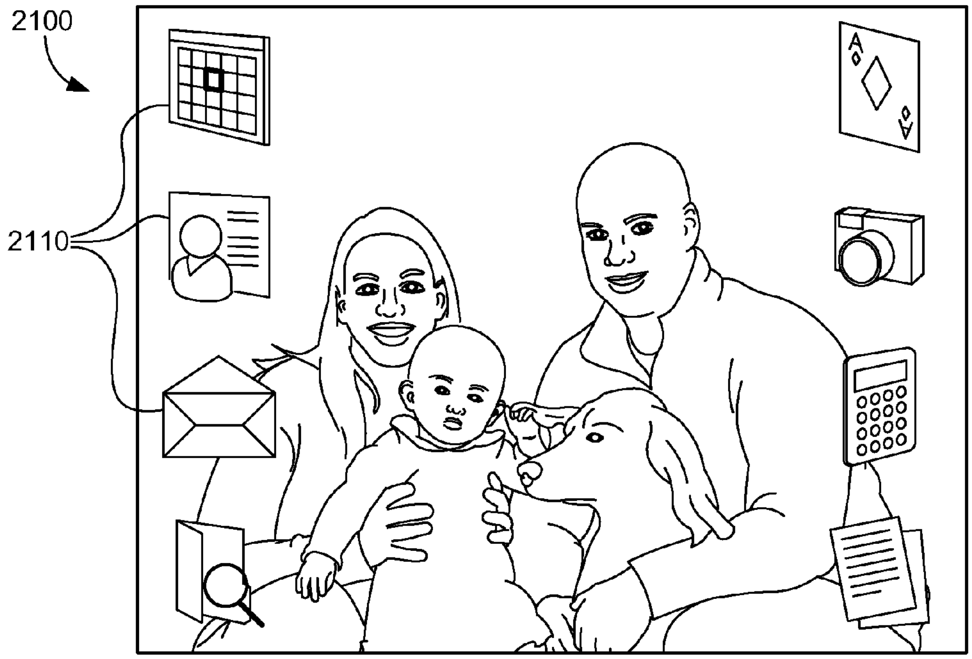
FIG. 21 depicts an illustrative presentation of icons included with selected portion of a background image with a buffer area in accordance with an embodiment of the present invention.

As seen in FIG. 21, in accordance with embodiments of the present invention, the resulting display screen of a mobile device provides a presentation of icons that is consistent with the protected portions of a background image. FIG. 21 depicts an illustrative presentation of icons 2110 consistent with a selected portion of a background image with a buffer area in accordance with an embodiment of the present invention. FIG. 21 presents an alternative resultant image showing the distribution of icons in accordance with an embodiment of the present invention as would be seen on a screen of a mobile device. In some embodiments, resultant FIG. 21 may be the result of a redistribution of icons that have already begun to encroach on desired image portions. In alternative embodiments, the distribution of icons are ordered to prevent overlapping with a selected portions from occurring as icons are added to the screen of the mobile device.

Figure 22:
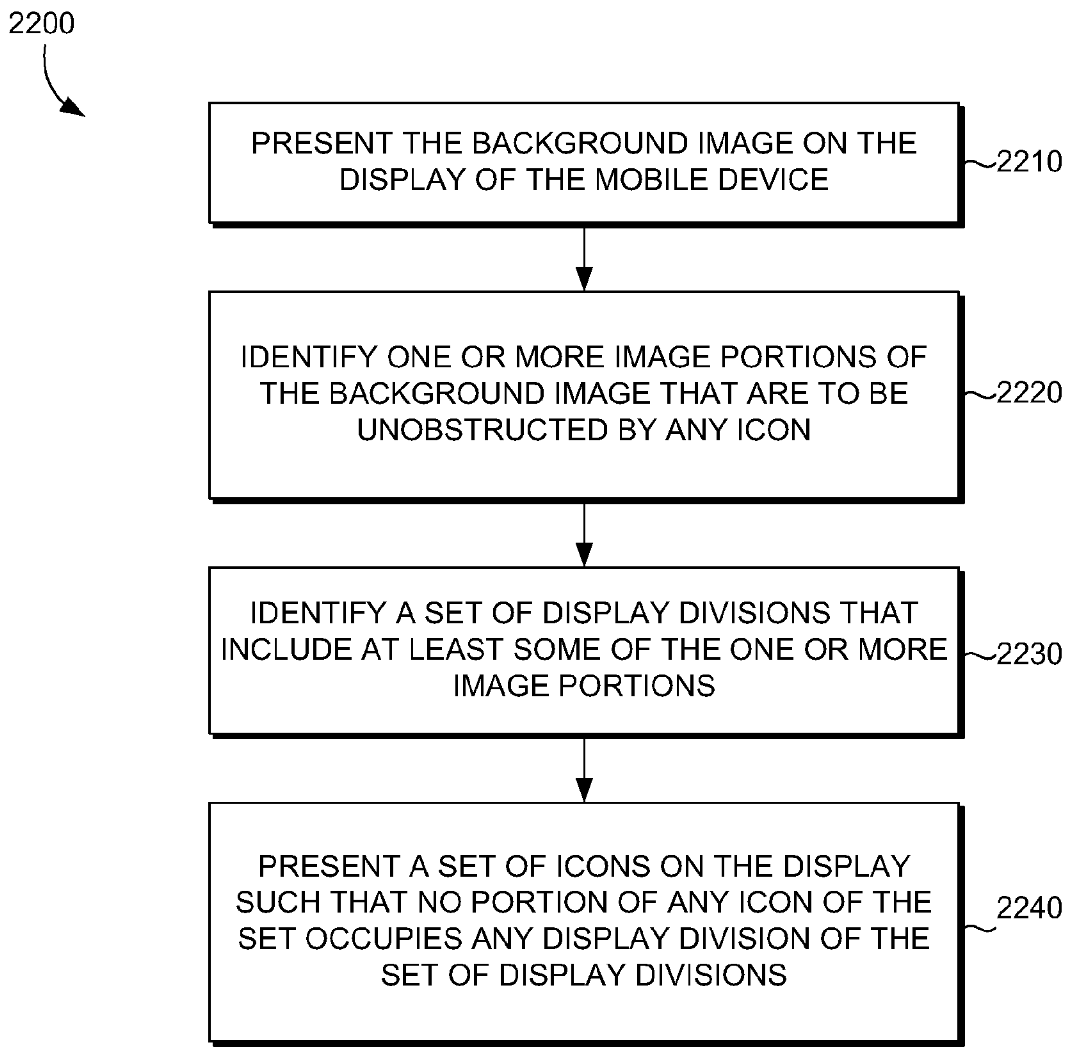
FIG. 22 is a flow diagram showing an embodiment of a method of preventing icons from overlapping one or more portions of a background image presented on a display of a mobile device, in accordance with an embodiment of the present invention.

FIG. 22 is a flow diagram 2200 showing an embodiment of a method of preventing icons from overlapping one or more portions of a background image presented on a display of a mobile device, in accordance with an embodiment of the present invention.

At step 2210, the background image is presented on the display of the mobile device. The display is logically dividable into a plurality of display divisions. Each display division is capable of presenting an icon. In alternative embodiments, the display divisions include one or more icons. In further alternative embodiments, the display divisions are capable of presenting a portion of an icon. In other words, display divisions may be set to a small enough size that multiple display divisions would be required to host each icon. In this embodiment, desired image portions may be more narrowly selected, allowing for the potential presentation of more icons in the larger, non-selected image portions. At step 2220, one or more image portions of said background image are identified that are to be unobstructed by any icon. The one or more image portions may be selected by a user or may be selected through the use of an algorithm. At step 2230, a set of display divisions are identified that include at least some of said one or more image portions. In alternative embodiments, display divisions that contain only a fraction of an image portion are also identified. At step 2240, a set of icons is presented on said display such that no portion of any icon of said set occupies any display division of said set of display divisions.

Figure 23:
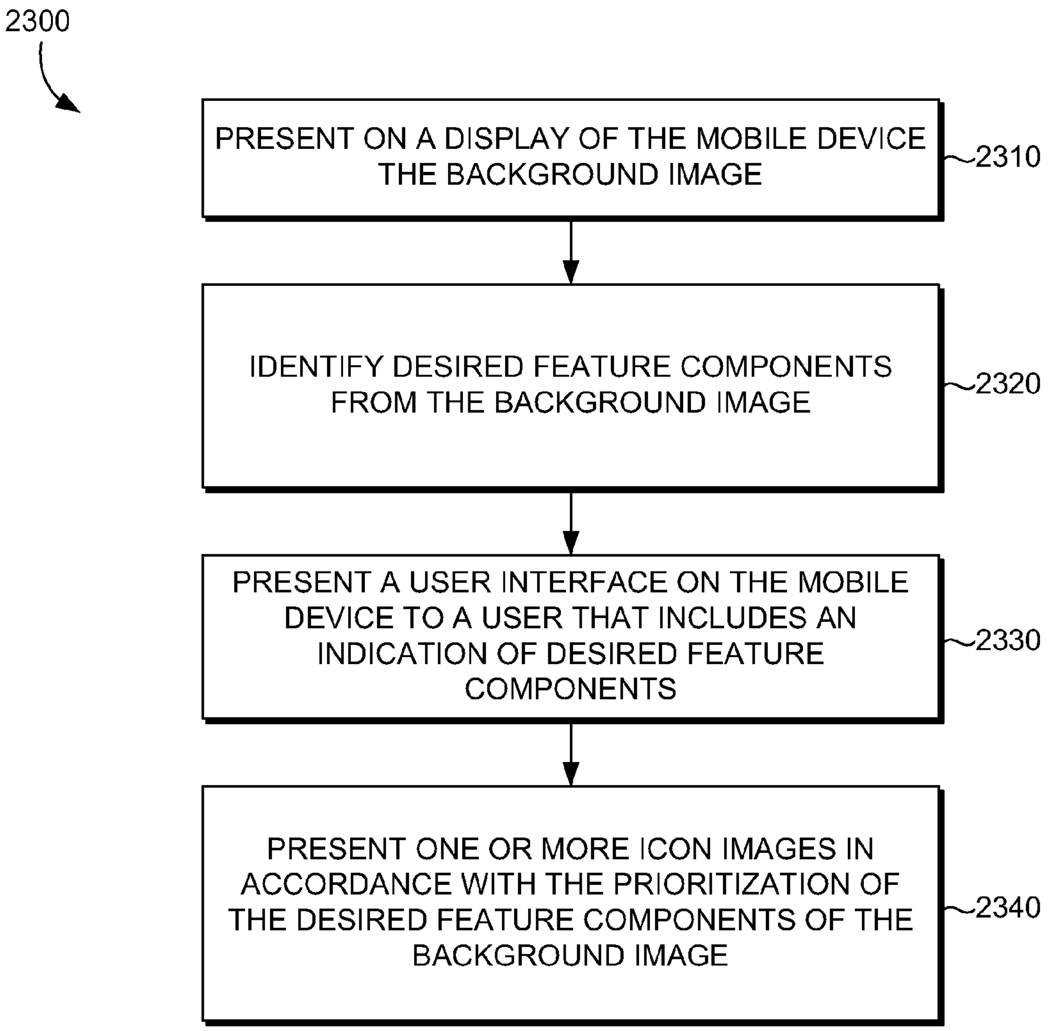
FIG. 23 is a flow diagram showing an embodiment of a method of prioritizing viewability of one or more desired portions of a background image presented on a mobile device, in accordance with an embodiment of the present invention.

FIG. 23 is a flow diagram 2300 showing an embodiment of a method of prioritizing viewability of one or more desired portions of a background image presented on a mobile device, in accordance with an embodiment of the present invention. At step 2310, the background image is presented on a display of the mobile device. The background image includes desired feature components. At step 2320, desired feature components are identified from the background image. The desired feature components may be identified by a user. Additionally or alternatively, desired feature components are identified through the use of a computing algorithm. At step 2330, a user interface is presented on the mobile device to a user that includes an indication of desired feature components. In embodiments of the invention, the user may select the size (e.g., screen area occupied) and/or shape of the boundaries used to define the desired feature components. Additionally or alternatively, the user indicates protected areas that are to cover the desired feature components so as to make the protected areas unavailable for population by icons. In alternative embodiments, a user prioritizes certain desired feature components over other desired feature components such that, if the user chooses, one or more of the desired feature components may take up less screen area or may be eliminated completely as the room for icons becomes unavailable. In these embodiments, a user may decide to prioritize the face of a family pet, such as the dog in FIGS. 9-21. However, as available space for presenting icons diminished, the user may prioritize the extra icon space more than the protection of the dog's face from being overlapped by icons. At step 2340, one or more icon images is presented in accordance with the prioritization of the desired feature components of the background image.

Figure 24:
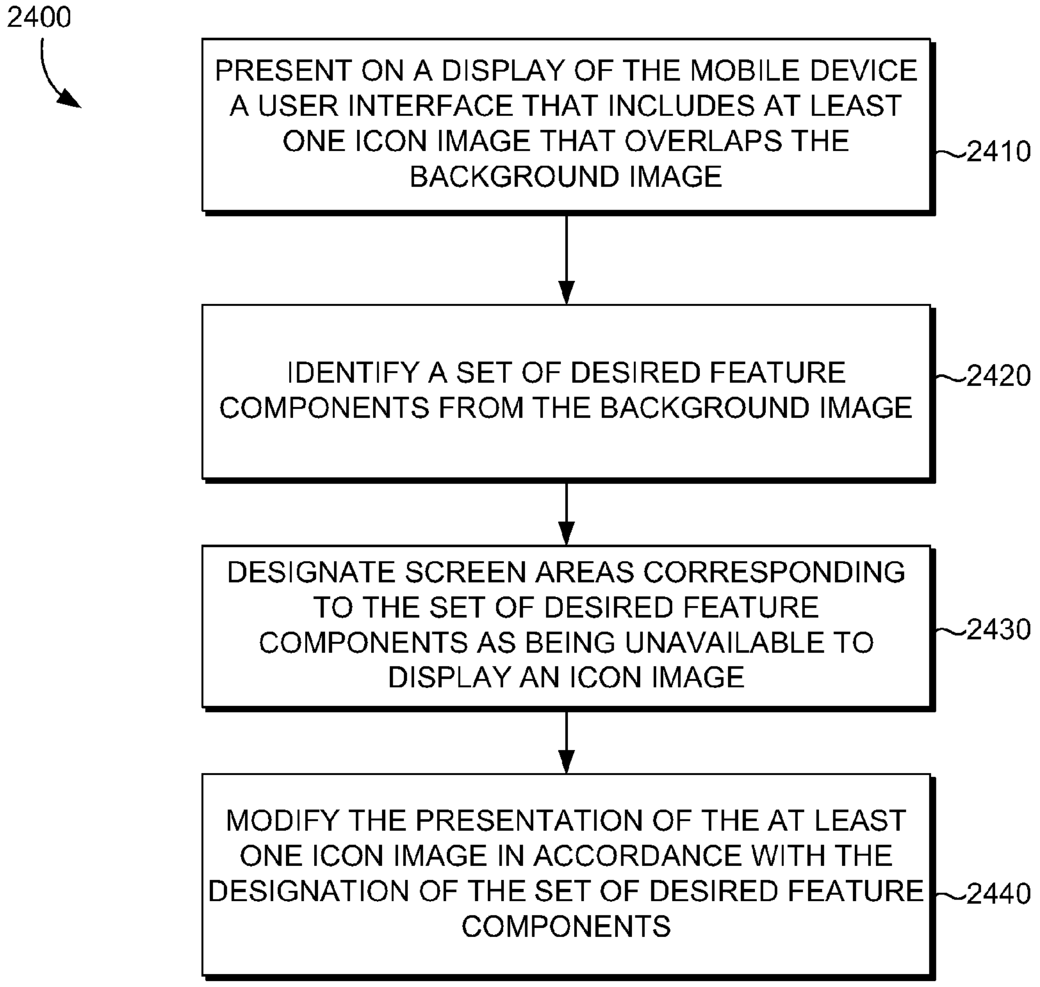
FIG. 24 is a flow diagram showing an embodiment of a method of modifying the presentation of icon images on a display of a mobile device, in accordance with an embodiment of the present invention.

FIG. 24 is a flow diagram 2400 showing an embodiment of a method of modifying the presentation of icon images on a display of a mobile device, in accordance with an embodiment of the present invention. As indicated at step 2410, a user interface that includes at least one icon image that overlaps the background image is presented on a display of the mobile device. At step 2420, a set of desired feature components is identified from the background image. The desired feature components may be identified by a user. Additionally or alternatively, desired feature components are identified through the use of a computing algorithm. At step 2430, screen areas corresponding to the set of desired feature components are designated as being unavailable to display an icon image. The protective screen areas may be defined by a user. Alternatively, the protective screen areas are selected by an algorithm. At step 2440, the presentation of the at least one icon image is modified in accordance with the designation of the set of desired feature components.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed, perform a method of prioritizing viewability of one or more desired portions of a background image presented on a mobile device, the method comprising:

presenting on a display of the mobile device the background image, wherein the background image includes desired feature components;

identifying the desired feature components from the background image, each desired feature comprising a first area for prioritization of the desired feature component;

presenting on the mobile device a user interface that includes an indication of the desired feature components;

receiving a selection for a buffer area that surrounds each of the desired feature components, the buffer area comprising a second area for prioritization of the desired feature component; and presenting one or more icon images in accordance with the prioritization of the desired feature components of the background image.

2. The media of claim 1, wherein at least one desired feature component contains a facial characteristic.

3. The media of claim 2, wherein the at least one desired feature component includes a face.

4. The media of claim 1, wherein the prioritization of the desired feature components includes a designation that icons are not allowed to overlap a portion of the desired feature components.

5. The media of claim 1, wherein the prioritization of the desired feature components is selected by a user of the mobile device.

6. The media of claim 1, wherein the prioritization of the desired feature components is computed through the use of an algorithm.

7. The media of claim 4, wherein one or more of a size or shape of a boundary that defines a first desired feature component is determined based on a user selection received via the user interface, wherein icons are not allowed to overlap the boundary such that an area within the boundary is unavailable for population by icons.

8. The media of claim 7, wherein a second desired feature component is prioritized over the first desired feature component such that the boundary that defines the first desired feature component is modified to take up less screen area or is eliminated completely as room for icons becomes unavailable.

9. The media of claim 7, wherein the second area surrounds the first desired feature component, and wherein the second area is also unavailable for population by icons.

10. The media of claim 9, wherein a second desired feature component is prioritized over the first desired feature component such that the second area that surrounds the first desired feature component is modified to take up less screen area or is eliminated completely as room for icons becomes unavailable.

11. A mobile device that prioritizes viewability of one or more desired portions of a background image presented on the mobile device, comprising:

a display;

one or more processing devices configured to

A) present the background image on the display of the mobile device, wherein the background image includes desired feature components, B) identify the desired feature components from the background image, C) present on the mobile device a user interface that includes an indication of the desired feature components, wherein a first protected area surrounds a first desired feature component, and D) present one or more icon images in accordance with a prioritization of the desired feature components of the background image and an alternative second protected area that surrounds the first desired feature component.

12. The mobile device of claim 11, wherein at least one desired feature component contains a facial characteristic.

13. The mobile device of claim 12, wherein the at least one desired feature component includes a face.

14. The mobile device of claim 11, wherein the prioritization of the desired feature components includes a designation that icons are not allowed to overlap a portion of the desired feature components.

15. The mobile device of claim 11, wherein the prioritization of the desired feature components is selected by a user of the mobile device.

16. The mobile device of claim 11, wherein the prioritization of the desired feature components is computed through the use of an algorithm.

17. The mobile device of claim 11, wherein the one or more processing devices are further configured to determine, based on a user selection, one or more of a size or shape of a boundary that defines a first desired feature component.

18. The mobile device of claim 17, wherein the one or more processing devices are further configured to prioritize a second desired feature component over the first desired feature component such that the boundary that defines the first desired feature component is modified to take up less screen area or is eliminated completely as room for icons becomes unavailable.

19. The mobile device of claim 11, wherein the one or more processing devices are further configured to determine the second protected area that surrounds the first desired feature component, wherein the second protected area is unavailable for population by icons.

20. The mobile device of claim 19, wherein the one or more processing devices are further configured to prioritize a second desired feature component over the first desired feature component such that the second protected area that surrounds the first desired feature component is modified to take up less screen area or is eliminated completely as room for icons becomes unavailable.

* * * * *